US012273352B2

(12) United States Patent
Tamir et al.

(10) Patent No.: US 12,273,352 B2
(45) Date of Patent: Apr. 8, 2025

(54) SYSTEMS, DEVICES, AND METHODS FOR SECURE FEATURE SELECTION

(71) Applicant: Synamedia Limited, Staines Upon Thames (GB)

(72) Inventors: Assaf Yosef Tamir, Jerusalem (IL); Vered Anikster, Jerusalem (IL); Steven Jason Epstein, Hashmonaim (IL); Itai Ephraim Zilbershtein, Hod Hasharon (IL)

(73) Assignee: Synamedia Limited, Maidenhead (GB)

( * ) Notice: Subject to any disclaimer, the term of this patent is extended or adjusted under 35 U.S.C. 154(b) by 480 days.

(21) Appl. No.: 17/500,158

(22) Filed: Oct. 13, 2021

(65) Prior Publication Data

US 2023/0113594 A1 Apr. 13, 2023

(51) Int. Cl.
*H04L 9/40* (2022.01)
*G06F 21/60* (2013.01)
*H04L 67/563* (2022.01)
*H04L 67/568* (2022.01)

(52) U.S. Cl.
CPC .......... *H04L 63/108* (2013.01); *G06F 21/602* (2013.01); *H04L 63/123* (2013.01); *H04L 63/205* (2013.01); *H04L 67/563* (2022.05); *H04L 67/568* (2022.05)

(58) Field of Classification Search
None
See application file for complete search history.

(56) References Cited

U.S. PATENT DOCUMENTS

| 10,997,320 | B1* | 5/2021 | Aggrawal | G06F 21/10 |
| 2013/0167193 | A1* | 6/2013 | Brookins | H04L 63/20 |
| | | | | 726/1 |
| 2015/0381756 | A1* | 12/2015 | Lotfallah | H04L 67/01 |
| | | | | 709/213 |
| 2017/0118537 | A1* | 4/2017 | Stransky-Heilkron | |
| | | | | G06F 21/16 |
| 2018/0205742 | A1* | 7/2018 | Vinukonda | H04L 63/107 |
| 2019/0171795 | A1* | 6/2019 | Seetharam | H04L 9/08 |
| 2020/0344307 | A1* | 10/2020 | Livshits | H04N 21/812 |
| 2021/0160329 | A1* | 5/2021 | Livshits | H04N 21/26258 |

* cited by examiner

*Primary Examiner* — Olugbenga O Idowu
(74) *Attorney, Agent, or Firm* — Fernando & Partners, LLP

(57) ABSTRACT

Techniques for embedding secure feature selection at content delivery network (CDN) edge are described. In accordance with various embodiments, server(s) in a cloud receive from a client device a request for a media URL associated with a media asset. The server(s) identify feature state(s) associated with the client device and the media asset on a CDN edge node hosting the media asset. The server(s) then selectively generate a unique token or a common token specifying the feature state(s) before sending the media URL including the unique token or the common token to the client device. Upon receiving the media URL, the CDN edge node in an edge node with features deployed, determines whether the media URL causes a cache miss. Upon determining that the media URL causes the cache miss, the CDN edge node changes a feature state of a feature, applies the feature, and provides the media asset.

20 Claims, 11 Drawing Sheets

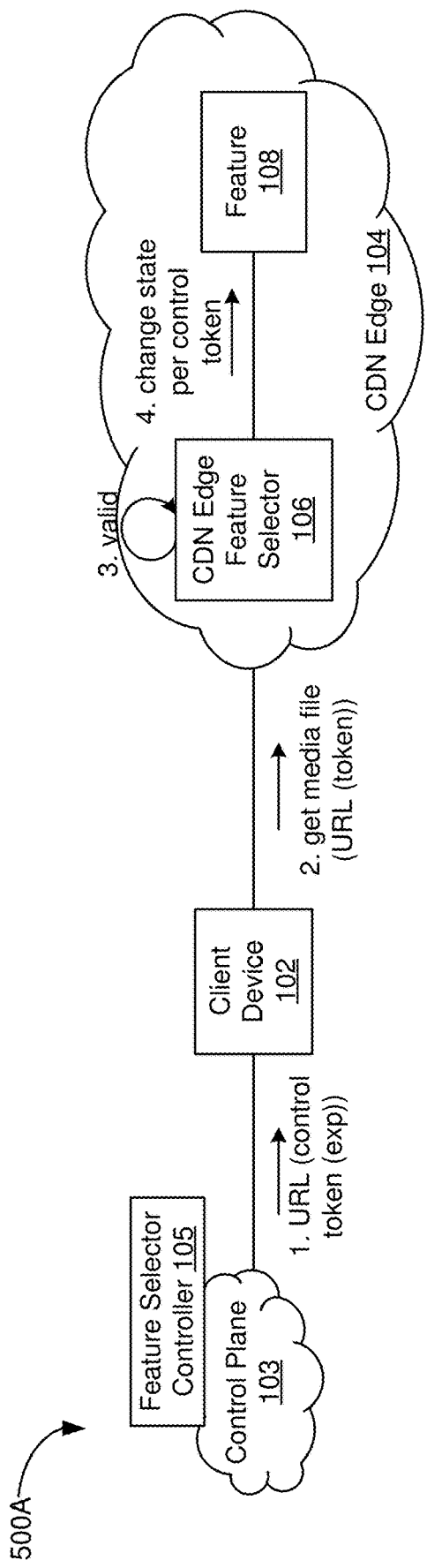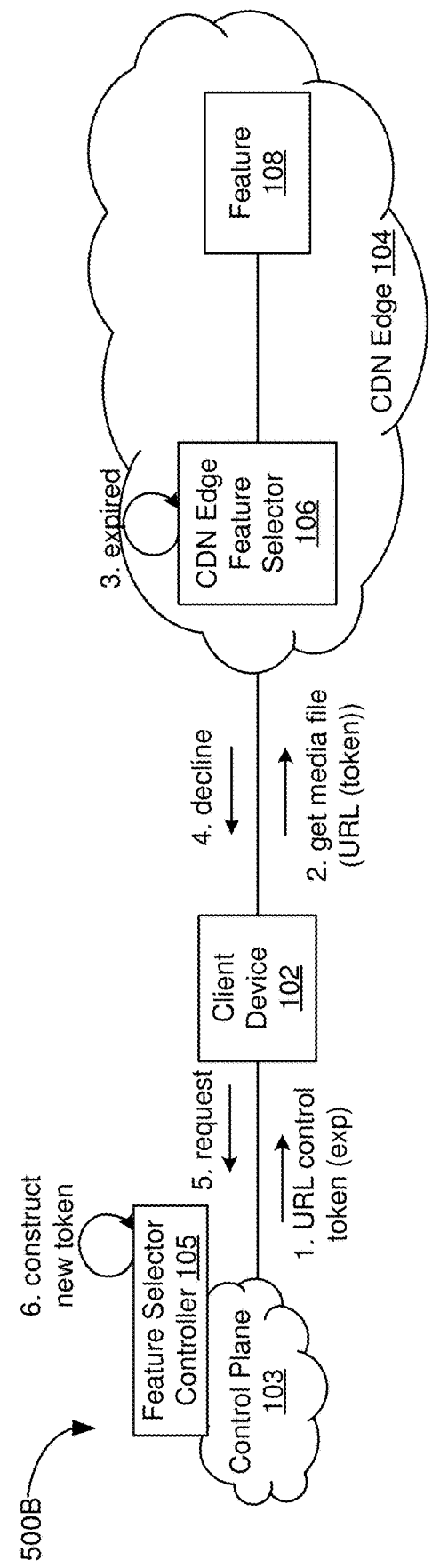

600

┌─────────────────────────────────────────────────────────────────────┐
│ The one or more servers includes a feature selector controller configured to perform │─ 660
│ the identifying step and the generating step, and the method further includes: (a) │
│ requesting a feature control token from the feature selector controller in response to │
│ receiving the request; (b) providing to the feature selector controller an asset identifier │
│ associated with the media asset and a client identifier associated with the client device; │
│ and (c) obtaining the feature control token as the unique token or the common token │
│ from the feature selector controller, where the feature selector controller determines │
│ whether to provide the unique token or the common token based on the asset identifier │
│ and the client identifier │
│  ┌─────────────────────────────────────────────────────────────┐ │
│  │ The feature selector controller is coupled to one or more feature configurators in │ │
│  │ the cloud configured to generate one or more features for deployment on the │─ 662
│  │ CDN edge node, and the method further includes: (a) mapping one or more client │ │
│  │ identifier and media asset identifier tuples to the one or more features; and (b) │ │
│  │ indicating whether the one or more client identifier and media asset identifier │ │
│  │ tuples receive the unique token or the common token │ │
│  │  ┌───────────────────────────────────────────────────┐ │ │
│  │  │ Embed an expiration time in the feature control token according to feature │ │ │
│  │  │ policies associated with the one or more features, where at the expiration │─ 664
│  │  │ time, the feature selector controller generates a second feature control │ │ │
│  │  │ token in response to a second request for the media URL and re- │ │ │
│  │  │ determines whether to provide the second feature control token as a │ │ │
│  │  │ second unique token or a second common token based on the feature │ │ │
│  │  │ policies │ │ │
└─────────────────────────────────────────────────────────────────────┘

┌─────────────────────────────────────────────────────────────────────┐
│ Perform one or more cryptographic operations on the unique token or the common │─ 670
│ token, where the unique token or the common token is decryptable or verifiable by the │
│ CDN edge node │
└─────────────────────────────────────────────────────────────────────┘

Forgoing changing the first feature state of the first feature among the plurality of features according to the first feature control token upon determining that the first media URL does not cause the cache miss ~760

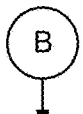

The first media URL for the media asset is received from a first client device, and the method further includes: (a) receiving a second media URL for the media asset from a second client device, where the second media URL includes a second feature control token different from the first feature control token; and (b) changing a second feature state of a second feature among the plurality of features according to the second feature control token ~762

The first media URL is received from a client device, the first feature control token specifies an expiration time of the first feature control token, and the method further includes: (a) determining whether the first feature control token has expired based on the expiration time in response to receiving the first media URL; and (b) declining the first feature control token upon determining that the first feature control token has expired, including forgoing the determining, the changing, and the applying steps, and triggering the client device to obtain a second feature control token ~764

Cache the first media URL, including the first feature control token, as a cache key for determining the cache miss ~766

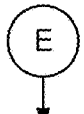

Decrypt the first feature control token by applying one or more cryptographic operations to generate a decrypted feature control token; and derive the first feature state of the first feature from the decrypted feature control token ~768

Figure 7B

SYSTEMS, DEVICES, AND METHODS FOR SECURE FEATURE SELECTION

TECHNICAL FIELD

The present disclosure relates generally to systems, devices, and methods for secure feature selection and, more specifically, to secure feature selection at content delivery network (CDN) edge.

BACKGROUND

A primary function of a content delivery network (CDN) is to provide content generated by an origin to clients with scale and robustness, especially when clients from geographically disbursed areas submit a high volume of concurrent requests for the content. CDNs often utilize technologies such as caching for massive content distribution to thousands of globally dispersed server nodes deployed in proximity to client devices. In recent years, internet content providers have extended CDN functionalities to allow deployment and customization of applications at the edge closer to the client devices. Extending such functionalities allows edge feature rendering, where specific customizations for certain clients do not apply to other clients.

According to the general principle of web services operation, the selection of which edge functionality is applicable for a particular customer request is determined by the URL provided in web requests, e.g., with a control plane allocating different URLs to different functions and/or content. However, introducing new features to an existing control plane with an existing URL scheme, where different URLs represent different types of content and/or variants of the content (e.g., on-screen titles), presents complex integration challenges. As such, both the upfront integration cost and the ongoing operational cost are high. Further, using different URLs exposes the feature enablement and disablement, thus allowing subversion and/or avoidance. For example, once different URLs for different features are exposed to the client devices, malicious users may use URLs that are mapped to the same content but without the security features to bypass security at the CDN edge. As such, previously existing feature enablement and disablement methods are inadequate from both cost and security perspectives.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 5A and 5B are diagrams illustrating configuring token expiration for mid-session feature selection, in accordance with some embodiments;

FIGS. 6A and 6B are flowcharts illustrating a method for generating feature control tokens for secure content delivery network (CDN) edge feature selection, in accordance with some embodiments;

FIGS. 7A and 7B are flowcharts illustrating using feature control tokens for secure CDN edge feature selection, in accordance with some embodiments;

Figure 1:
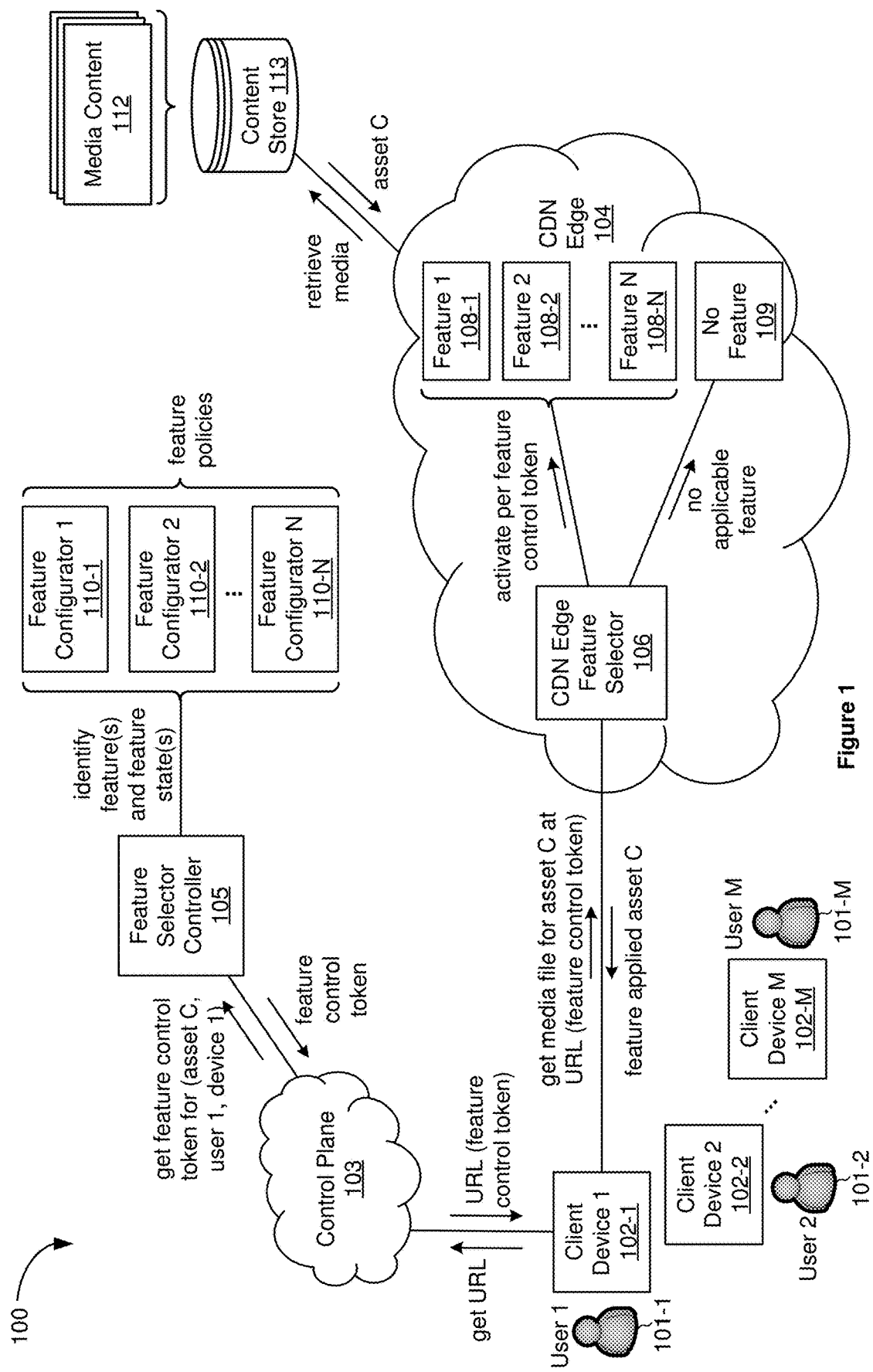
FIG. 1 is a block diagram of an exemplary content delivery system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, a method for secure feature selection at content delivery network (CDN) edge uses cache hit and miss to control feature states. The feature selection customizes feature enablement and disablement without separate manifest files for each user, thus enhancing security and performance. In some embodiments, an edge feature selector controller in the cloud integrates with the control plane and provides the control plane with an encrypted control token to add to media URLs (e.g., manifest URLs). In some embodiments, a CDN edge feature selector at the edge decodes the control token received in a manifest request from a respective client and determines whether to activate any of the CDN edge features for the particular request based on the information in the control token.

In accordance with various embodiments, a method is performed at one or more servers with one or more processors and one or more non-transitory memory in a cloud. The method includes receiving from a client device a request for a media URL associated with a media asset. The method further includes identifying one or more feature states associated with the client device and the media asset on a content delivery network (CDN) edge node (e.g., located in an edge cloud) hosting the media asset. The method also includes selectively generating a unique token or a common token specifying the one or more feature states. The method additionally includes sending the media URL referencing the CDN edge node (e.g., located in the edge cloud) to the client device, where the media URL includes the unique token or the common token.

In accordance with various embodiments, a method is performed at a content delivery network (CDN) edge node in an edge cloud with a plurality of features deployed on the CDN edge node. The method includes receiving a first media URL for a media asset, wherein the first media URL includes a first feature control token. The method further includes determining whether the first media URL causes a cache miss. The method also includes changing a first feature state of a first feature among the plurality of features according to the first feature control token upon determining that the first media URL causes the cache miss. The method additionally includes applying the first feature according to the first feature state and providing the media asset.

EXAMPLE EMBODIMENTS

As described above, it is often desirable to enable certain features for specific clients as determined by the content delivery network (CDN) nodes that the clients reach, e.g., allowing certain clients to consume specific content at specific times, and/or possibly at specific geographic locations, etc. It is also desirable to bypass such features for other clients at no CDN costs. For example, embedding watermarks in media content requested by certain client devices helps to determine whether such client devices are sources of illegally acquired media. In another example, extensive logging can be enabled for a period of time for troubleshooting, user-experience monitoring, and/or security reasons, and disabled afterward to conserve resources. In yet another example, diversion of media requests for playing specific content, e.g., selective advertisements, selective promotional videos, specific localization, is useful for certain regions and/or regional events. In still another example, timed blackouts are desirable when at the beginning of an event, viewers in proximity to a stadium are redirected to watch a separate event. As such, it is often necessary to enable or disable certain features at different times for different clients. Also as described above, previously existing systems have cost and security issues when introducing new features to the existing control plane based on existing URL schemes.

The methods, devices, and systems described herein address the aforementioned issues by providing a secure and cost effective way for new CDN edge features to be controlled and selected by an edge feature selector controller in the cloud. The edge feature selector controller is a single integration point to the control plane, thus minimizing the integration effort and requiring no changes to existing clients. Using feature control tokens, the feature selection process is secure without exposing different features for subversion and/or avoidance. In particular, the edge feature selector controller controls whether a CDN edge feature selector would work at least once for every client device or would be bypassed for most of the client devices. To work at least once, each URL returned to the client device has a different token, thus causing a cache miss at the CDN for each request, which in turn triggers the activation of the CDN edge feature selector to activate feature(s). To mostly bypass the CDN edge feature selector, the same token (e.g., a common token) is provided for multiple URL requests. As such, the CDN edge feature selector would be activated for the first request for a given URL that causes a cache miss and would be bypassed for subsequent requests to the URL. Accordingly, the CDN edge feature selector is activated to work on cache misses for feature selection, and cache hits will benefit from any feature that has been rendered on a previous cache miss.

Reference is now made to FIG. 1, which is a block diagram of an exemplary content delivery system 100 with secure feature selection at the edge in accordance with some embodiments. In some embodiments, the exemplary system 100 is an over-the-top (OTT) streaming system that includes a control plane 103 and an edge cloud including a content delivery network (CDN) edge node 104 (also referred to as the CDN edge 104). In the exemplary OTT streaming system 100, one sub-system, e.g., the control plane 103, authenticates a respective user 101 (e.g., user 1 101-1, user 2 101-2, . . . , user M 101-M) using a respective client device 102 (e.g., client device 1 102-1, client device 2 102-2, . . . , client device M 102-M), while another sub-system, e.g., the CDN edge 104 provides resource services. The authentication performed by the control plane 103 is thus a precursor to getting an authorization token for access to the resources provided by the CDN edge 104, e.g., the services and/or media content 112 either cached by the CDN edge 104 or obtained from a content store 113.

In FIG. 1, a legitimate, e.g., user 1 101-1 uses client device 1 102-1 to login to a control plane 103 and to request tokens from the control plane 103 in accordance with some embodiments. In some embodiments, during the login phase, the control plane 103 authenticates the legitimate user 1 101-1 based on the information received from client device 1 102-1. Upon authenticating the legitimate user 1 101-1, the control plane 103 sends to client device 1 102-1 authorization tokens for CDN access (and/or access control information such as digital rights management (DRM) licenses, etc.). Client device 1 102-1 can then use the authorization token to request and access content on a CDN 104. As used herein, "content" is referred to as "multimedia content", "media content", "a media asset", "a media content item", "a content item", or "an asset", and includes, but is not limited to, video and/or audio.

In some embodiments, an edge feature selector controller 105 (also referred to as hereinafter as the feature selector controller 105) is integrated with the control plane 103 and provides a feature control token to the control plane 103 upon request. The feature selector controller 105 is coupled with a plurality of feature configurators 110 (e.g., feature configurator 1 110-1, feature configurator 2 110-2, . . . , feature configurator N 110-N) for configuring a plurality of features 108 (e.g., feature 1 108-1, feature 2 108-2, . . . , feature N 108-N) deployed on the CDN edge 104. Also, on the CDN edge 104, a CDN edge feature selector 106 is coupled with the plurality of features 108 and activates one or more features 108 according to the feature control token. As used herein, a respective feature 108 can be a module or a plug-in generated by a respective feature configurator 110 and deployed on the CDN edge 104, e.g., installed and/or configured and ready to be activated. Each feature 108 can have different feature states (also referred to hereinafter as the states). In a default state, the respective feature 108 is deployed but deactivated (e.g., the plug-in and/or module not being executed or run) to conserve resources on the CDN edge 104. When activated (e.g., the plug-in and/or module being executed or run), the respective feature 108 performs certain tasks, such as embedding watermarks, extensive logging, diversion of media requests, and/or providing timed blackouts, etc.

For example, in FIG. 1, when user 1 101-1 selects media asset C to play on client device 1 102-1, e.g., selecting a video or a channel to view, client device 1 102-1 connects to the control plane 103 and requests a media URL corresponding to media asset C (e.g., a manifest URL for a video or a channel). The control plane 103 authenticates user 1 101-1 and/or client device 1 102-1 based on the information received from client device 1 102-1, e.g., authenticating based on a user identifier (ID), a client device ID, and/or a device type, etc. Upon authenticating user 1 101-1 and/or client device 1 102-1, the control plane 103 requests from the feature selector controller 105 a feature control token (also referred to hereinafter as the control token) by providing information of media asset C (e.g., a channel name or a channel ID) and the entity making the request (e.g., the user ID, and the client device ID, and/or the device type, etc.).

In some embodiments, as will be described in further detail below, the feature selector controller 105 determines feature states such as which edge features would be activated for the request based on the configurations set by feature configurators 110 (e.g., pre-provisioned and/or dynamically configured per request), where the feature configurators 110 configure features by applying feature policies, e.g., as configured by an administrator. The feature selector controller 105 then creates and returns to the control plane 103 the feature control token that provides information to the CDN edge 104 as to what edge feature(s) 108 to activate, as well as additional information (e.g., the user ID, the device type, and/or the requested feature mode, etc.) necessary for the feature activation.

In the example shown in FIG. 1, the control plane 103 returns a media URL that includes the URL for media asset C (e.g., a manifest URL) and the feature control token, where the host part in the URL points to the CDN edge 104. In some embodiments, the feature control token returned from the feature selector controller 105 is appended as part of the media URL. When client device 1 102-1 uses the media URL to make a request for a corresponding media file (e.g., a manifest), the CDN edge 104 receives the request, which includes the URL for the corresponding media file and the feature control token.

In some embodiments, for enhanced security, the feature control token is encoded and encrypted in a way that is decodable and decryptable by the CDN edge feature selector 106. For example, applying one or more cryptographic operations according to symmetric cryptography (e.g., using a shared key) or asymmetric cryptography (e.g., public and private key), the feature selector controller 105 protects the feature control token so that the feature control token is decodable, decryptable, and/or verifiable by the CDN edge feature selector 106.

In some embodiments, as will be described in further detail below, the CDN edge feature selector 106 on the CDN edge 104 is activated to work on cache misses. In such embodiments, subsequent cache hits benefit from what a respective feature 108 that has been rendered on a previous cache miss, thus conserving edge computational resources. When the CDN edge feature selector 106 is active, the CDN edge feature selector 106 obtains the feature control token in the media URL and decodes the feature control token. The CDN edge feature selector 105 then activates feature(s) 108 according to the information specified in the feature control token. In some embodiments, the CDN edge feature selector 106 supplies the features 108 with additional information in the feature control token (e.g., the user ID, the device type, and/or the requested feature mode, etc.). In some embodiments, in the case of not finding any feature control token or the feature control token not including any activation for the edge features 108, the CDN edge feature selector 106 forwards the request to a module 109 that follows the regular CDN flow for handling media file requests. In some embodiments, following the processing by the CDN edge feature selector 106, the CDN edge 104 fetches the media file from origin 112 to satisfy the request, e.g., retrieving media file(s) referenced by the manifest.

As described above, previously existing methods for introducing and managing CDN edge functionality are costly, risky, and allow for subversion and/or avoidance. In contrast, using the cache hit and miss for controlling feature activation and deactivation, the exemplary system 100 incurs no additional cost when a particular feature 108 is deactivated, e.g., in its default state. Further, the feature selector controller 105 allows one integration point with the control plane 103 for the configuration of multiple features 108 by the feature configurators 110, thus reducing the integration cost and risk. Additionally, the feature control (e.g., activation, deactivation, and/or client specific metadata generation) is obscured from the client devices 102, thus improving security. As such, the feature selection methods, devices, and systems described herein can support massive scale through state transmission in the base URLs with feature control tokens and are capable of applying mass mid-session features at a low cost.

Figure 2:
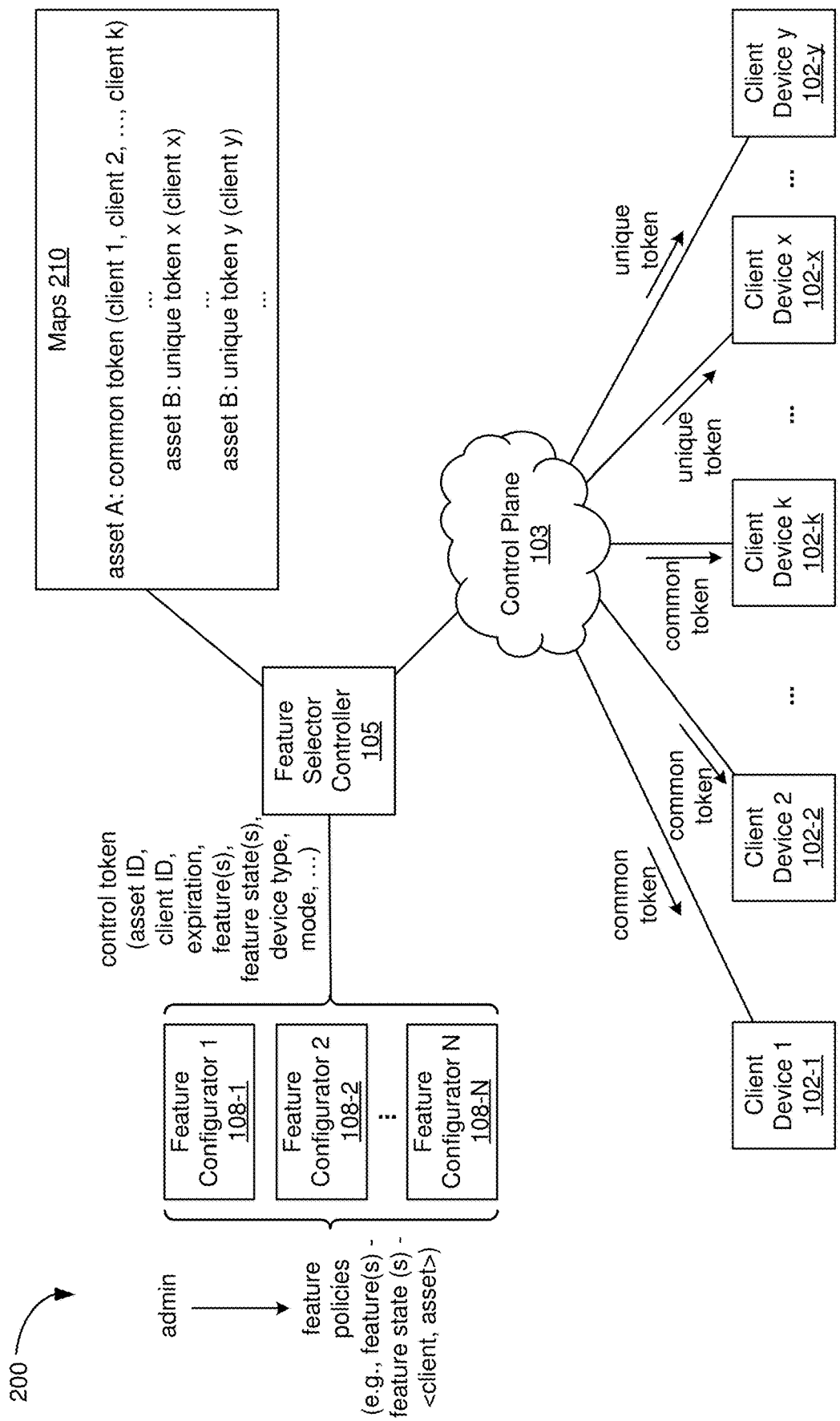
FIG. 2 is a diagram illustrating constructing feature control tokens based on feature policies and mappings in the exemplary content delivery system, in accordance with some embodiments.

FIG. 2 is a diagram 200 illustrating constructing feature control tokens based on feature policies and mappings in the exemplary content delivery system 100 (FIG. 1) in accordance with some embodiments. In some embodiments, administrators configure the feature policies so the feature configurators 108 maintain parameters, settings, and/or criteria for applying the features at the edge, e.g., which features are applicable to a particular media asset, to which client, at what time of the day, and/or the duration of a feature at a feature state, etc. Based on the feature policies, the feature selector controller 105 in the cloud constructs and configures the feature control token, including the expiration time, in accordance with some embodiments.

In some embodiments, the feature selector controller 105 configures the feature control tokens according to maps 210, so that the CDN edge feature selector 106 (FIG. 1) works on a few cache misses or on many different requests. In the case of configuring the feature control token so that the CDN edge feature selector is activated on a few cache misses, the feature selector controller 105 maps a set of client devices 102 to the same feature control token, thus ensuring very few cache misses and that the CDN edge feature selector is mostly deactivated. In such embodiments, the feature control token is provided as the common token. In the case of configuring the feature control token so that the CDN edge feature selector is activated on many different requests, the feature selector controller 105 maps unique feature control tokens to different requests (e.g., mapping different control tokens to different client asset tuples), activating the CDN edge feature selector 106 to activate different customized features for different clients. In such embodiments, the feature control token is provided as a unique token to each client.

For example, in FIG. 2, the feature selector controller 105 records in the maps 210 the mapping of a common token to client device 1 102-1, client device 2 102-2, . . . , client device k 102-k. The common token can be constructed and sent to client device 1 102-1, client device 2 102-2, . . . , client device k 102-k in response to requests (e.g., for media asset A). In some embodiments, the common token specifies the feature state of the one or more features on the CDN edge. In some embodiments, the parameters of the common token, including the expiration time, are the same for client devices 1 102-1 through client device k 102-k to enable cache key indexing for determining cache misses or cache hits. Further, in some embodiments, the common token specifies the expiration time of the common token, so that when the token expires, a new control token is requested and issued. Also as shown in FIG. 2, the feature selector controller 105 records in the maps 210 the mapping of unique token x to client device x 102-*x* and the mapping of unique token y to client device y 102-*y*. For instance, unique token x is constructed in response to one request from client device x 102-*x* for asset B and is associated with the activation of one set of features, and unique token y is constructed in response to another request from client device y 102-*y* for asset B and is associated with the activation of another set of features. Similar to the common token, in some embodiments, a respective unique token also specifies the expiration time of the unique token, so that when the token expires, a new control token is requested and issued.

According to such mappings 210, to mostly bypass the CDN edge feature selector 106 (FIG. 1) as will be shown and described in further detail below with reference to FIG. 3, the feature selector controller 105 provides the common token in response to a plurality of URL requests for asset A from client device 1 102-1, client device 2 102-2, ..., client k 102-*k*. In some embodiments, parameters of the common token attached to the URL, including the expiration time, are the same to enable cache key indexing at the CDN edge. When the first one of the plurality of URL requests causes a cache miss, the CDN edge feature selector 106 is activated, which further changes the state(s) of feature(s) according to the common token, e.g., deactivating feature(s). In response to subsequent URL requests from anyone of client device 1 102-1, client device 2 102-2, ..., client k 102-*k*, the common token would be sent and the CDN edge feature selector 106 would be bypassed to conserve resources on the CDN edge. In contrast, as will be shown and described in further detail below with reference to FIG. 4, in response to the requests from client device x 102-*x* and client device y 102-*x*, based on the maps 210, the feature selector controller 105 provides unique tokens. As a result, for each of such requests, the CDN edge feature selector 106 would be activated and configure the state(s) of feature(s) according to the unique token, e.g., activating feature(s). As a result, feature(s) are customized for different client devices in response to different URL requests.

Using the feature selector controller 105, features are configured in the cloud and the activation of the features at the CDN edge is fast and cost effective. As shown in FIG. 2, the feature selector controller 105 is a single integration point to the existing control plane 103 for multiple features, thus minimizing the integration effort. There are no changes to the existing clients when introducing new features, and the feature selector controller 105 in the cloud has granular control over how new features are activated and deactivated. Further, because the configuration of the features is securely communicated to the CDN edge via tokens, there are no changes to the existing URL schemes. As such, the integration cost is low and the activation of the features at the CDN edge is secure.

Figure 3:
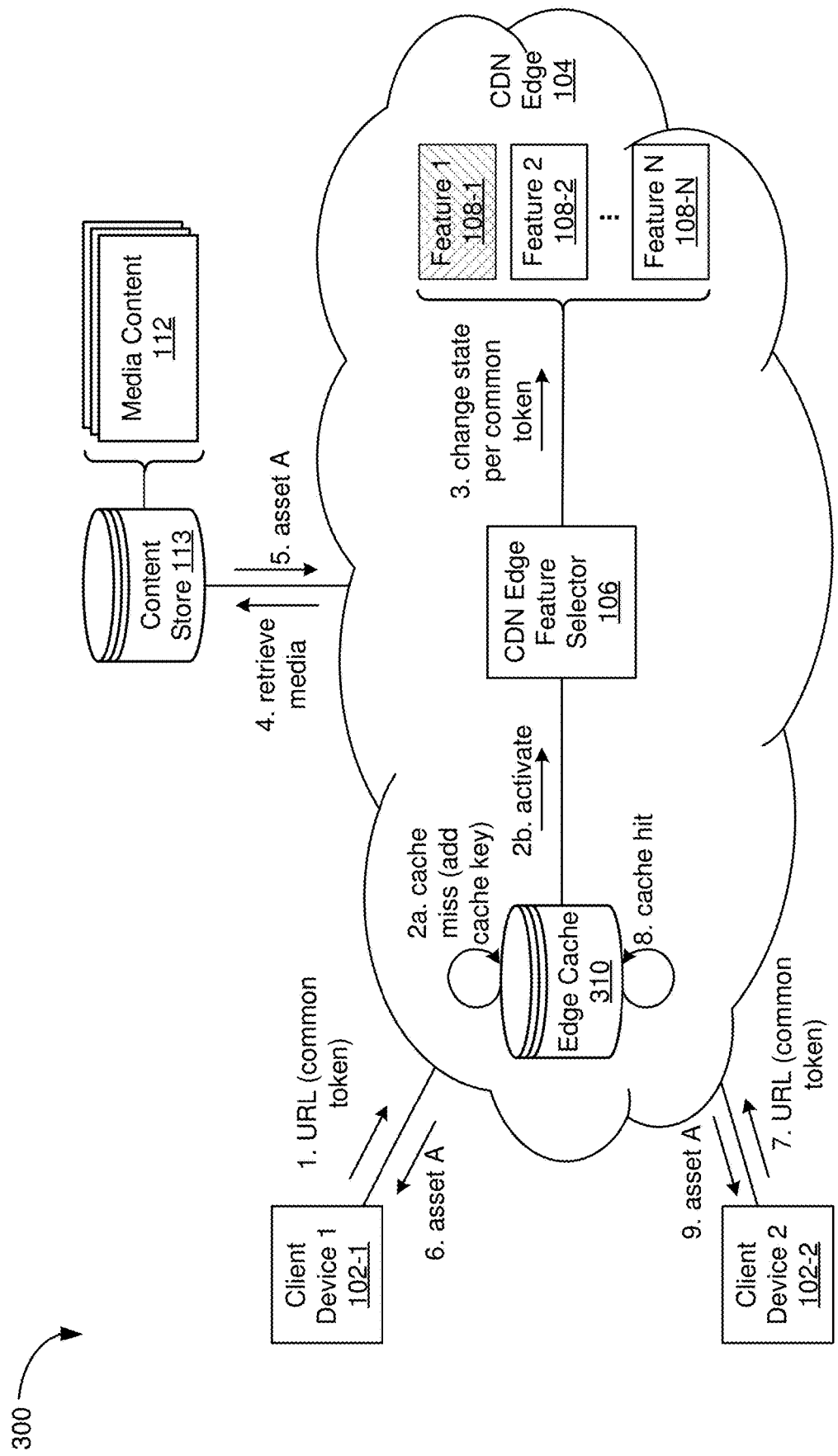
FIG. 3 is a diagram illustrating using common tokens for secure feature selection in the exemplary content delivery system, in accordance with some embodiments.

FIG. 3 is a diagram 300 illustrating using common tokens for secure feature selection in the exemplary content delivery system 100 (FIG. 1) in accordance with some embodiments. In FIG. 3, client device 1 102-1 first sends a media URL (e.g., a manifest URL) requesting a media file (e.g., a manifest for asset A) including a common token (e.g., a feature control token that is common and mapped to a plurality of client devices, as shown in FIG. 2) to the CDN edge 104 in step 1. In step 2a, the media URL causes a cache miss, e.g., not finding a cache key corresponding to the media URL with the common token in an edge cache 310. In some embodiments, the CDN edge 104 adds the media URL including the common token to the cache key index in the edge cache 310. Further, in some embodiments, the cache miss triggers the activation of the CDN edge feature selector 106 in step 2b. When activated, the CDN edge feature selector 106 receives the request and decodes the common token in accordance with some embodiments.

In step 3, the CDN edge feature selector 106 changes the feature state(s) of the feature(s) 108 according to the information in the common token. In some embodiments, the CDN edge feature selector 106 also provides the edge feature 108 with additional information in the common token pertaining to the feature that is encoded in the common token (e.g., the client-ID, device type, specific feature mode to apply, etc.). In some embodiments, a common token includes information to deactivate at least one feature 108, e.g., entering a default state to conserve resources on the CDN edge 104. In the example shown in FIG. 3, according to the information in the common token, feature 1 108-1 is deactivated. In steps 4 and 5, if necessary, the CDN edge 104 fetches the media content 112 from the content store 113 to satisfy the request, e.g., retrieving asset A as illustrated in step 5 according to the manifest file. In step 6, the CDN edge 104 sends asset A to client device 1 102-1.

When subsequent media requests are made by client device 1 102-1 or client device 2 102-2 to CDN edge 104 with the same media URL and the common token, e.g., the same URL with the common token sent from client device 2 102-2 to the CDN edge 104 in step 7, such subsequent requests cause cache hits in step 8, e.g., locating a record corresponding to the cache key added in step 2a in the edge cache 310. Because cache hits would not trigger the activation of the CDN edge feature selector 106, feature 1 108-1 remains deactivated. Accordingly, there is no extra cost to the CDN edge 104 for providing the asset to client device 2 102-2 in step 9.

As shown in FIG. 3, activating the CDN edge feature selector 106 to work on cache misses saves cost, because cache hits will benefit from whatever a respective feature 108 has been rendered on a previous cache miss. For example, in the case of feature 1 108-1 being a watermark embedding feature, there is no watermark embedded in the asset provided to both client device 1 102-1 and client device 2 102-2. In another example, in the case of feature 1 108-1 being a targeted advertisement feature, the default advertisements would be provided to both client device 1 102-1 and client device 2 102-2, e.g., no personalized targeted advertisements. In yet another example, in the case of feature 1 108-1 being an extensive logging feature, the default logging, such as standard logging would be used on the CDN edge 104. As such, the cost saving during cache hits is realized by not activating both the CDN edge feature selector 106 and feature 1 108-1.

Figure 4:
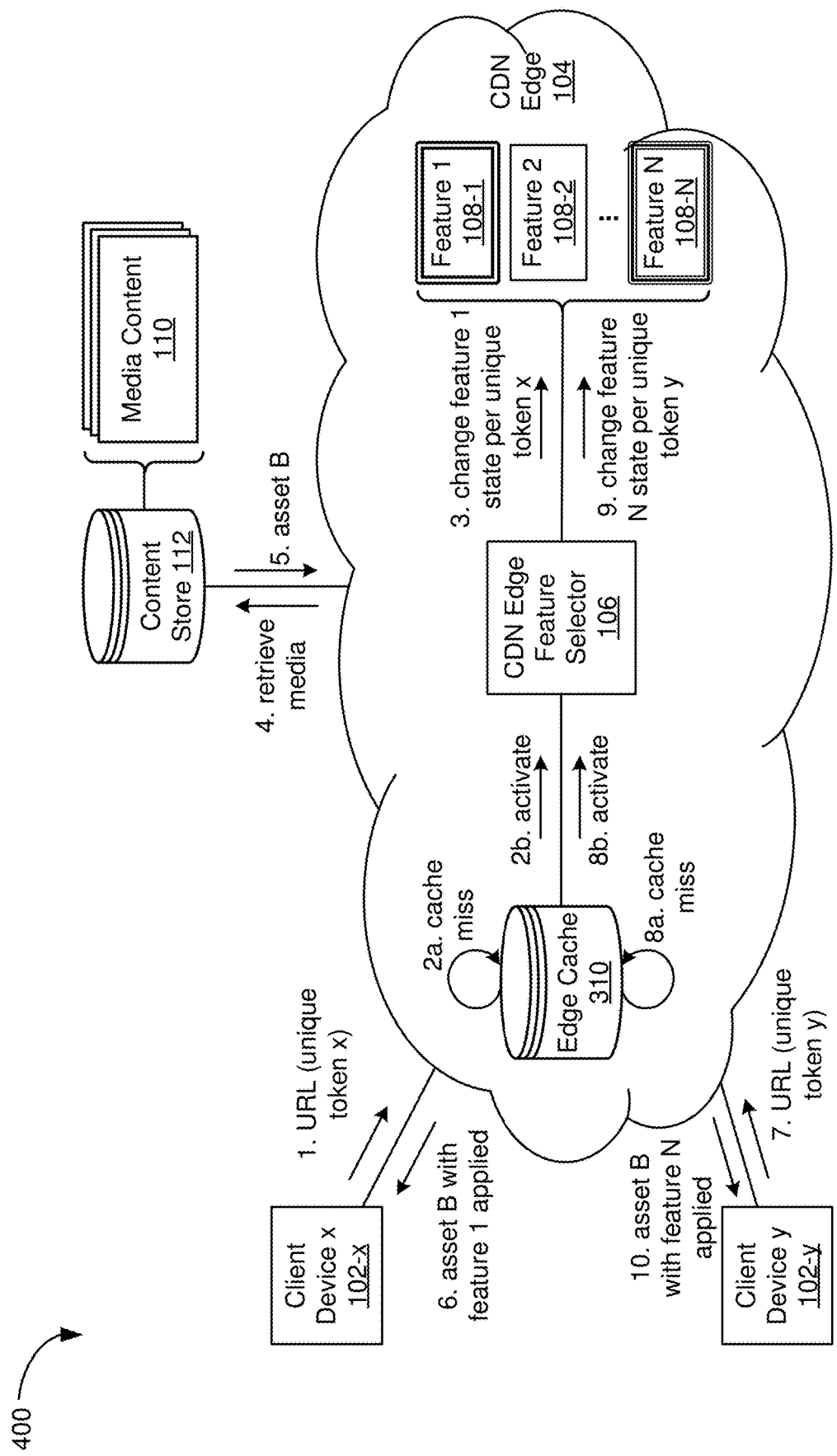
FIG. 4 is a diagram illustrating using unique tokens for secure feature selection in the exemplary content delivery system, in accordance with some embodiments.

FIG. 4 is a diagram 400 illustrating using unique tokens for secure feature selection in the exemplary content delivery system 100 (FIG. 1) in accordance with some embodiments. In FIG. 4, client device x 102-*x* first sends a media URL (e.g., a manifest URL) requesting a media file (e.g., a manifest for media asset B) including unique token x (e.g., a feature control token that is unique and mapped to client device 1 102-1 in the maps 210, FIG. 2) to the CDN edge 104 in step 1. In step 2a, the media URL including unique token x causes a cache miss, e.g., not finding a cache key corresponding to the media URL in the edge cache 310. In some embodiments, the cache miss triggers the activation of the CDN edge feature selector 106 in step 2b.

When activated, the CDN edge feature selector 106 receives the request and decodes unique token x in accordance with some embodiments. Further, in step 3, the CDN edge feature selector 106 changes the feature state(s) of the feature(s) 108 according to the information in unique token x. In some embodiments, the CDN edge feature selector 106 also provides the edge feature 108 with additional information associated with the feature that is encoded in unique token x (e.g., the client-ID, device type, specific feature mode to apply, etc.). In some embodiments, a unique token includes information to activate at least one feature 108, e.g., entering a personalized state. In the example shown in FIG. 4, according to the information in unique token x, feature 1 108-1 is activated.

In steps 4 and 5, if necessary, the CDN edge 104 fetches the media content 112 from the content store 113 to satisfy the request, e.g., retrieving asset B as illustrated in step 5 according to the manifest file. In step 6, the CDN edge 104 sends asset B to client device 1 102-1 with feature 1 108-1 applied. For example, in the case of feature 1 108-1 being a watermark embedding feature, activating the watermark embedding feature would embed a unique watermark identifier in the media asset to assist in determining whether client device 1 102-1 has been the source of any illegally acquired copies of the media asset. In some embodiments, activating the watermark embedding feature would select an asset with a specific watermark digit, so that the CDN edge 104 selects which asset to serve rather than performing the actual watermark embedding in the asset. In another example, in the case of feature 1 108-1 being an extensive logging feature, a specialized localization feature, and/or a timed blackout at the beginning of an event for users in a particular region, feature 1 108-1 would be activated so that extensive loggings are recorded, the specialized feature is applied, and/or the timed blackout is displayed for client device 1 102-1.

When client device 2 102-2 makes a subsequent request to the CDN edge 104 with a different unique token, e.g., with unique token y sent from client device 2 102-2 to the CDN edge 104 in step 7, such a subsequent request again causes cache misses in step 8a. Because cache misses would trigger the activation of the CDN edge feature selector 106, each of such media requests with the unique tokens would trigger the activation of the CDN edge feature selector 106 to activate the feature(s) 108 for customization. In FIG. 4, for example, upon decrypting and/or decoding unique token y, the CDN edge feature selector 106 activates feature N 108-N in step 9. In step 10, the CDN edge 104 provides the media asset to client device 2 102-2 with feature N 108-N applied, e.g., a unique watermark embedded, extensive logging recorded, redirecting to a separate event, and/or providing a selective promotional video, etc.

FIGS. 5A and 5B are diagrams 500A and 500B illustrating configuring token expiration for mid-session feature selection in accordance with some embodiments. In FIG. 5A, following the processes described above with reference to FIGS. 1-4, the feature selector controller 105 constructs a feature control token, and in step 1, the control plane 103 provides a media URL to the client device 102 that includes the feature control token. In some embodiments, the feature control token includes an expiration time. For example, the feature selector controller 105 can orchestrate the token expiration based on the feature policies known to the feature configurators 110 as shown in FIGS. 1 and 2, e.g., policies specifying the schedule of an event and/or the criteria of which client devices would have blackouts, etc. In step 2, the client device 102 sends the request for the media file to the CDN edge 104 using the media URL with the feature control token. In step 3, the CDN edge feature selector 106 validates the feature control token by checking the expiration time of the feature control token in accordance with some embodiments. Upon validating the feature control token, in step 4, the CDN edge feature selector 106 changes the feature state of a respective feature 108 according to the information in the feature control token.

In contrast, in FIG. 5B, after step 1 and step 2, the CDN edge feature selector 106 determines that the feature control token has expired. Accordingly, instead of changing the feature state of the feature 108, in some embodiments, the CDN edge feature selector 106, in step 4, rejects the feature control token, e.g., returning an error code. In response to receiving the error code, the client device 102 requests another feature control token in step 5. In step 6, the feature selector controller 105 constructs a new feature control token, e.g., as a different type and with a different expiration time. In some embodiments, instead of having the CDN edge feature selector 106 reject the expired feature control token as a triggering event for refreshing the feature control token, when the client device 102 is provided with the feature control token from the control plane 103 in step 1, the client device 102 is instructed to request and refresh the feature control token before it expires.

By configuring the token expiration time, mid-session feature switching behavior (e.g., activating or deactivating) can be achieved without any changes to the data plane. For example, before an event (e.g., selective advertisements, brief blackouts, temporary extensive logging for diagnosis, etc.), short-lived tokens with a common short expiration time can be provided to viewers of the short-lived event. After the event ends, the token expiration time and the type of tokens provided to the client device 102 can change, e.g., from common token to unique token or vice versa, and/or from a short expiration time to a long expiration time, etc.

Figure 6A:
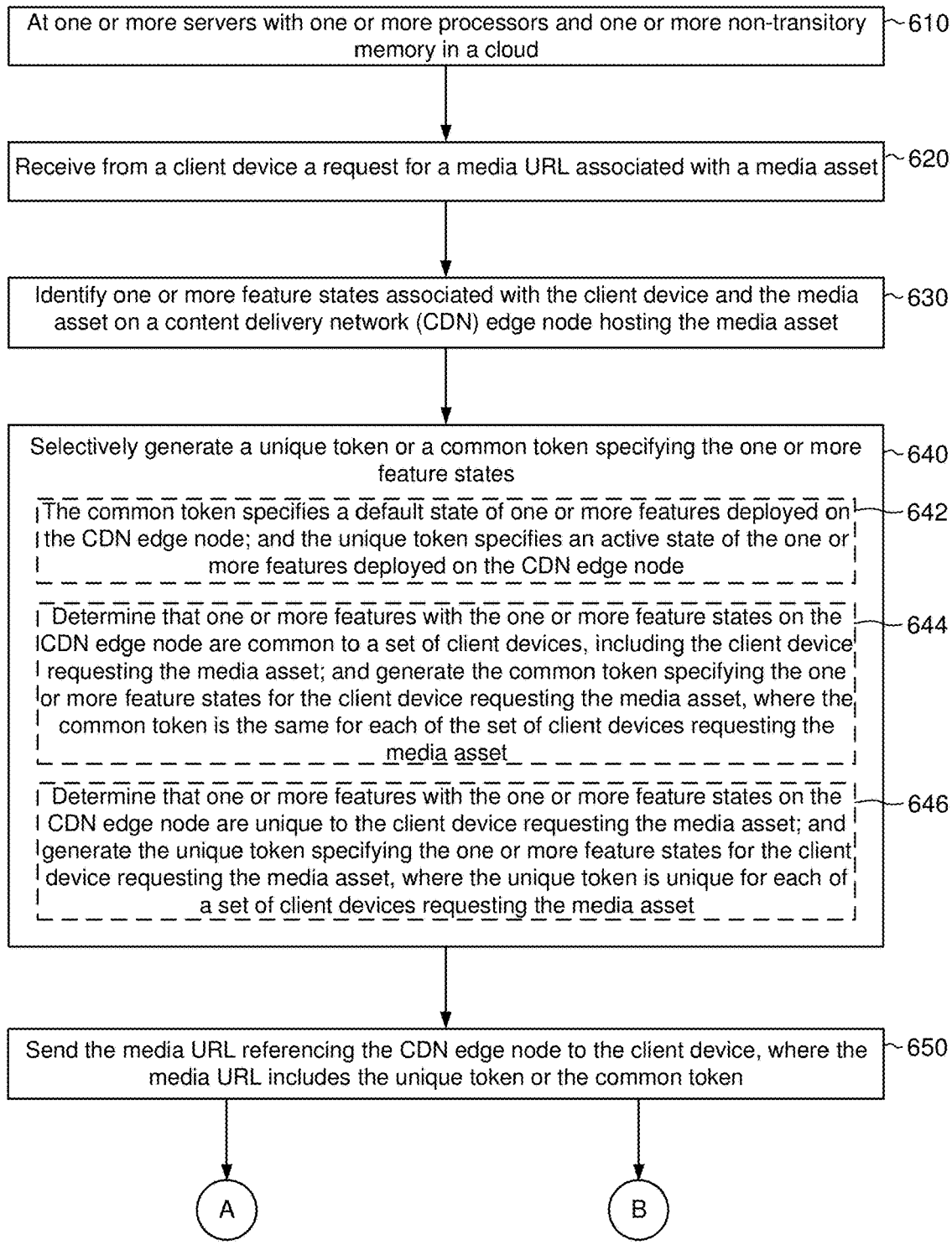

FIGS. 6A and 6B are flowcharts illustrating a method 600 for generating feature control tokens for secure CDN edge feature selection in accordance with some embodiments. In some embodiments, as represented by block 610, the method 600 is performed at one or more servers in a cloud, e.g., one or more servers for the control plane 103, the feature selector controller 105, and/or the feature configurators 110 in the cloud in the exemplary OTT streaming system 100 in FIG. 1. In some embodiments, the one or more servers include one or more processors and one or more non-transitory memory (e.g., for storing the feature policies and/or the maps 210 in FIG. 2).

As represented by block 620, the method 600 begins with the one or more servers receiving from a client device a request for a media URL associated with a media asset. For example, in FIG. 1, the control plane 103 receives from client device 1 102-1 a request to obtain the media URL and sends information from the URL request (e.g., requesting asset C, from user 1, device 1, etc.) along with a request to obtain a feature control token to the feature selector controller 105. As represented by block 630, the method 600 continues with the one or more servers identifying one or more feature states associated with the client device and the media asset on a CDN edge node hosting the media asset. For example, in FIG. 1 the feature selector controller 105 identifies one or more feature states of one or more features based on the information received from the control plane 103, e.g., based on the associations of the features and feature states with the client-asset tuples specified in the features policy. As represented by block 640, the method 600 continues with the one or more servers selectively generating a unique token or a common token specifying the one or more feature states, e.g., the feature control token providing instruction to the CDN edge as to what edge feature(s) to activate or deactivate, as well as additional information such as user ID, device type, requested feature mode, etc. for the feature(s).

In some embodiments, as represented by block 642, the common token specifies a default state of one or more features deployed on the CDN edge node, and the unique token specifies an active state of the one or more features deployed on the CDN edge node. For example, in FIG. 3, the common token specifies the default state of feature 1 108-1 on the CDN edge 104; while in FIG. 4, unique token x specifies an active state of feature 1 108-1 and unique token y specifies an active state of feature N 108-N.

In some embodiments, as represented by block 644, selectively generating the unique token or the common token specifying the one or more feature states includes determining that one or more features with the one or more feature states on the CDN edge node are common to a set of client devices, including the client device requesting the media asset, and generating the common token specifying the one or more feature states for the client device requesting the media asset, where the common token is the same for each of the set of client devices requesting the media asset. In some embodiments, as represented by block 646, selectively generating the unique token or the common token specifying the one or more feature states includes determining that one or more features with the one or more feature states on the CDN edge node are unique to the client device requesting the media asset, and generating the unique token specifying the one or more feature states for the client device requesting the media asset, where the unique token is unique for each of a set of client devices requesting the media asset.

For example, in FIG. 2, the feature selector controller 105 controls whether the CDN edge selector 106 (FIG. 1) would be activated at least once for every client device 102 or would be bypassed for most of the client devices 102 based on the information in the maps 210. In the example shown in FIG. 2, the feature selector controller 105 maps a set of client devices (e.g., client device 1 102-1 through client device k 102-k) to a common token in the maps 210. As a result, as shown in FIG. 3, the common token is the same for both client device 1 102-1 and client device 2 102-2 requesting asset A, and according to the common token, feature 1 108-1 is in the same default state for both client device 1 102-1 and client device 2 102-2. In comparison, also shown in FIG. 2, the feature selector controller 105 specifies in the maps 210 that for asset B, client device x 102-x is mapped to unique token x and client device y 102-y is mapped to unique token y, so that the feature selector controller 105 is activated at least once for every client device 102. Once such unique tokens cause cache misses and the CDN edge selector 106 is activated, as shown in FIG. 4, according to unique token x, the CDN edge feature selector 106 activates feature 1 108-1 for client device 1 102-1 and according to unique token y, the CDN edge feature selector 106 activates a different feature N 108-N for a different client device 2 102-2.

Still referring to FIG. 6A, as represented by block 650, the method 600 continues with the one or more servers sending the media URL referencing the CDN edge node to the client device, where the media URL includes the unique token or the common token. Turning to FIG. 6B, as represented by block 660, in some embodiments, the one or more servers includes a feature selector controller configured to perform the identifying step and the generating step, and the method 600 further includes requesting a feature control token from the feature selector controller in response to receiving the request, providing to the feature selector controller an asset identifier associated with the media asset and a client identifier associated with the client device, and obtaining the feature control token as the unique token or the common token from the feature selector controller, where the feature selector controller determines whether to provide the unique token or the common token based on the asset identifier and the client identifier. For example, in FIG. 1, the control plane 103 requests a feature control token from the feature selector controller 105 and provides information such as the requested asset C (e.g., a channel name) and the entity making the request (e.g., the user ID of user 1 101-1, the device ID of client device 1 102-1, and/or the device type, etc.). The control plane 103 then obtains the feature control token from the feature selector controller 105 based on such information.

In some embodiments, as represented by block 662, the feature selector controller is coupled to one or more feature configurators in the core network configured to generate one or more features for deployment on the CDN edge node, and the method 600 further includes mapping one or more client identifier and media asset identifier tuples to the one or more features, and indicating whether the one or more client identifier and media asset identifier tuples receive the unique token or the common token. For example, in FIG. 1, the feature configurators 110 are coupled to the feature selector controller and are configured to generate the features 108 for deployment on the CDN edge 104, e.g., according to the configurations and/or feature policies set by the administrators (pre-provisioned or dynamically per request). Further, in FIG. 2, the feature selector controller 105 determines whether to provide the feature control token as a common token or a unique token based on the maps 210, which includes mappings of the tokens to the asset identifiers and the client identifiers and indicates whether, for each asset and client combination, the token is a common token or a unique token.

In some embodiments, as represented by block 664, in such embodiments, the method 600 further includes embedding an expiration time in the feature control token according to feature policies associated with the one or more features, where at the expiration time, the feature selector controller generates a second feature control token in response to a second request for the media URL and re-determines whether to provide the second feature control token as a second unique token or a second common token based on the feature policies. For example, in FIG. 5A, the feature control token received by the client device 102 has an expiration time, e.g., a short-lived token before an event configured by the feature selector controller 105 according to the feature policies. Upon determining that the feature control token is valid, e.g., not expired, the CDN edge feature selector 106 changes the feature state of the feature 108 according to the information in the feature control token. After the event ends, as shown in FIG. 5B, in some embodiments, the feature selector controller 105, in response to a request from the client device 102, the feature selector controller 105 constructs a new feature control token according to the feature control policies. As such, the new feature control token can be a different type (e.g., a common token or a unique token) and with a different expiration time.

In some embodiments, as represented by block 670, the method 600 further includes performing one or more cryptographic operations on the unique token or the common token, wherein the unique token or the common token is decryptable or verifiable by the CDN edge node. For example, in FIG. 1, the feature selector controller 105 protects the feature control token in a way the CDN edge feature selector 106 can decode, e.g., using a shared key to encrypt and decrypt and symmetric cryptography, or using public and private keys to sign and verify and asymmetric cryptography.

Figure 7A:
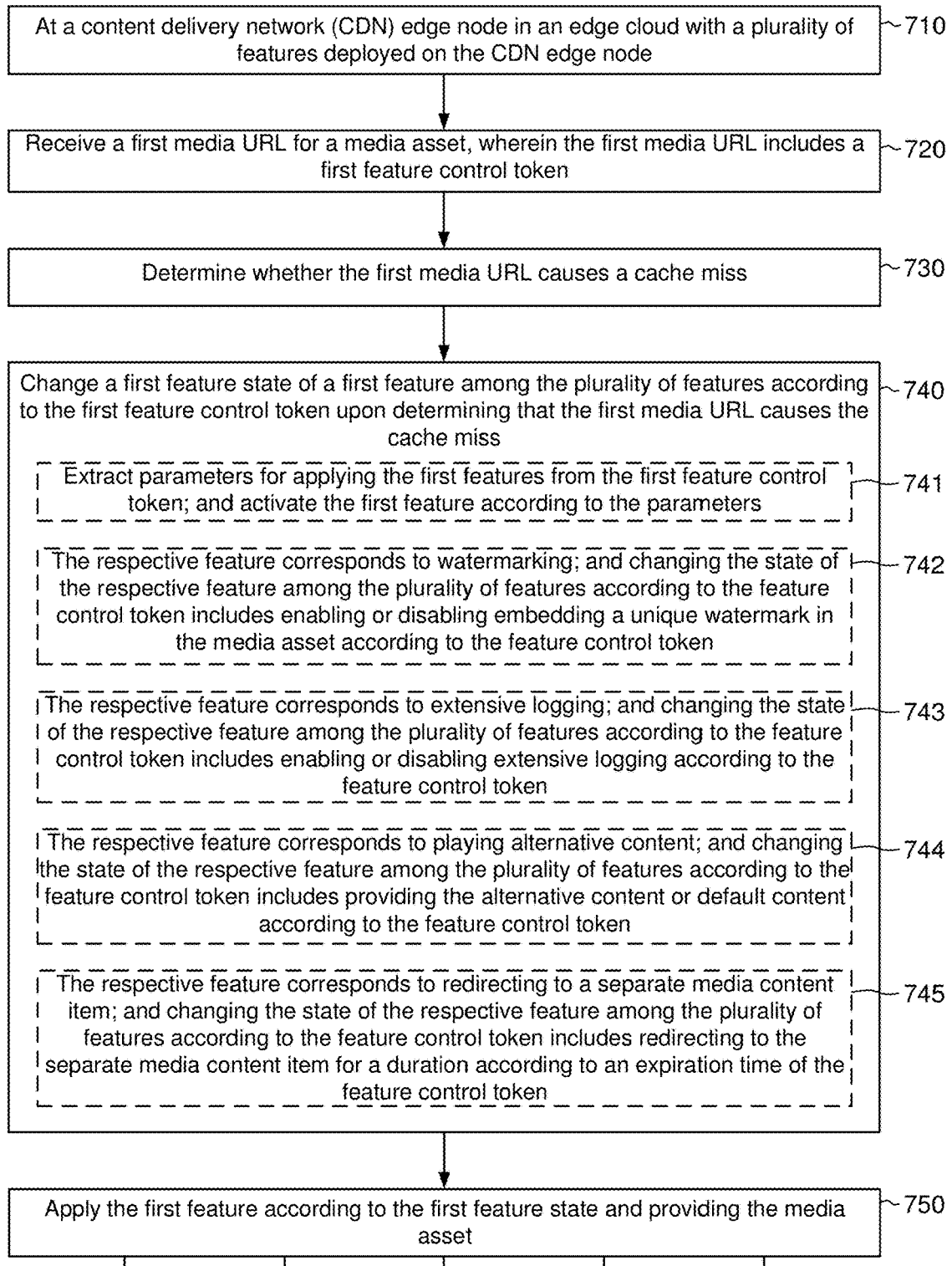

FIGS. 7A and 7B are flowcharts illustrating a method 700 for using feature control tokens for secure CDN edge feature selection in accordance with some embodiments. In some embodiments, as represented by block 710 in FIG. 7A, the method 700 is performed at a CDN edge node in an edge cloud with a plurality of features deployed on the CDN edge node, e.g., the CDN edge 104 in the edge cloud in the exemplary OTT streaming system 100 in FIG. 1 that includes the CDN edge feature selector 106 and the plurality of features 108. In some embodiments, the CDN edge node includes one or more processors and a non-transitory memory (e.g., the edge cache 310 in FIGS. 3 and 4), which stores instructions (e.g., instructions for the CDN edge feature selector 106 and/or the features 108, FIG. 1) being executed by the one or more processors.

The method 700 begins with the CDN edge node receive a first media URL for a media asset, wherein the first media URL includes a first feature control token, as represented by block 720. For example, in FIG. 1, client device 1 102-1 makes a request to the CDN edge 104 for the media file (e.g., a manifest for asset C) at a location corresponding to the URL, which includes the feature control token. The method 700 continues with the CDN edge node determining whether the first media URL causes a cache miss, as represented by block 730. As represented by block 740, the method 700 also includes changing a first feature state of a first feature among the plurality of features according to the first feature control token upon determining that the first media URL causes the cache miss. For example, in FIG. 3, when the cache miss causes activation of the CDN edge feature selector 106, according to the information in the common token, in step 3 of FIG. 3 the CDN edge feature selector 106 changes the feature state of feature 1 108-1. In another example, when the cache misses cause activation of the CDN edge feature selector 106, according to the information in the unique tokens, in steps 3 and 9 of FIG. 4, the CDN edge feature selector 106 changes the feature state of feature 1 108-1 and the feature state of feature N 108-N respectively.

In some embodiments, as represented by block 741, changing the first feature state of the first feature among the plurality of features according to the first feature control token includes extracting parameters for applying the first features from the first feature control token, and activating the first feature according to the parameters. For example, in FIG. 2, the feature selector controller 105 packages parameters such as asset ID, client ID, expiration time, feature(s), feature state(s), device type, and/or mode, etc. in the feature control token. In FIG. 1, when the CDN edge feature selector 106 receives the feature control token, the CDN edge feature selector 106 extracts such parameters and activating the feature 108 according to the extracted parameters.

In some embodiments, as represented by block 742, the respective feature corresponds to watermarking, and changing the state of the respective feature among the plurality of features according to the feature control token includes enabling or disabling embedding a unique watermark in the media asset according to the feature control token. For example, a watermark embedding feature can be activated to embed a unique watermark identifier when a particular client requesting a media file. The specific variant of the media file, e.g., with a unique watermark identifier embedded, when played, would later assist in determining whether the particular client has been the source of an illegally acquired media asset.

In some embodiments, as represented by block 743, the respective feature corresponds to extensive logging, and changing the state of the respective feature among the plurality of features according to the feature control token includes enabling or disabling extensive logging according to the feature control token. For example, an extensive logging feature can be activated for troubleshooting, user experience monitoring, and/or security reasons. When deactivated, the default standard logging can be used to save storage and/or computational resources on the CDN edge node.

In some embodiments, as represented by block 744, the respective feature corresponds to playing alternative content, and changing the state of the respective feature among the plurality of features according to the feature control token includes providing the alternative content or default content according to the feature control token. For example, a feature for playing alternative content can be activated to divert media requests and play customized content along with playing the pre-tuned channel, such as injecting selective advertisements, selective promotional videos, and/or localized content. When deactivated, the default content is played along with the media asset, e.g., the pre-tuned channel.

In some embodiments, as represented by block 745, the respective feature corresponds to redirecting to a separate media content item, and changing the state of the respective feature among the plurality of features according to the feature control token includes redirecting to the separate media content item for a duration according to an expiration time of the feature control token. For example, a timed blackout feature is activated, at the beginning of an event, viewers proximate to a stadium are redirected to watch a separate event for a brief period. At the expiration time of the timed blackout, the timed blackout feature is deactivated to allow the viewers to watch the event at the stadium.

Still referred to FIG. 7A, as represented by block 750, the method 700 continues with the CDN edge node (e.g., with the CDN edge feature selector 106, FIG. 1) applying the first feature according to the first feature state and providing the media asset, e.g., providing the media asset while embedding a unique watermark, enabling extensive logging, providing localized targeted content, and/or redirecting to a different event, etc.

Turning to FIG. 7B, as represented by block 760, in some embodiments, the method 700 further includes forgoing changing the first feature state of the first feature among the plurality of features according to the first feature control token upon determining that the first media URL does not cause the cache miss. For example, in FIG. 3, the request from the second client device (e.g., client device 2 102-2) for asset A causes a cache hit in step 8 instead of a cache miss. Because the request from client device 2 102-2 does not cause any cache miss, the subsequent request made by client device 2 102-2 does not trigger the activation of the CDN edge feature selector 106 to change the feature state of feature 1 108-1.

As represented by block 762, in some embodiments, the first media URL for the media asset is received from a first client device, and the method 700 further includes receiving a second media URL for the media asset from a second client device, where the second media URL includes a second feature control token that is different from the first feature control token, and changing a second feature state of a second feature among the plurality of features according to the second feature control token. For example, in FIG. 4, the first request from the first client device (e.g., client device x 102-x) for asset B causes a cache miss in step 2a, and the second request from the second client device (e.g., client device y 102-y) for asset B with the same media URL but a different unique token y also causes a cache miss in step 8a. Because the second request from client device 2 102-2 also causes a cache miss, the CDN edge feature selector 106 is activated in step 8b and changes the feature state of feature N 108-N according to unique token y.

As represented by block 764, in some embodiments, the first media URL is received from a client device, the first feature control token specifies an expiration time of the first feature control token, and the method 700 further includes determining whether the first feature control token has expired based on the expiration time in response to receiving the first media URL, and declining the first feature control token upon determining that the first feature control token has expired, including forgoing the determining, the changing, and the applying steps, and triggering the client device to obtain a second feature control token. For example, in FIGS. 5A and 5B, the feature control token included in the URL from the client device 102 has an expiration time. In FIG. 5B, the CDN edge feature selector 106 decides, based on the expiration time in the feature control token that it has expired in step 3. Accordingly, in some embodiments, the CDN edge feature selector 106 declines the request from the client device 102 in step 4, e.g., sending an HTTP error. In some embodiments, the error triggers the client device 102 to return to the control plane 103 and requests another feature control token in step 5.

As represented by block 766, in some embodiments, the method 700 further includes caching the first media URL, including the first feature control token, as a cache key for determining the cache miss. For example, in step 2a of FIG. 3, the first media URL can be added as a cache key to the edge cache. Because the first media URL includes the common token, which is the same for both client device 1 102-1 and client device 2 102-2, the subsequent request from client device 2 102-2 would cause a cache hit in step 8.

As represented by block 768, in some embodiments, the method 700 further includes decrypting the first feature control token by applying one or more cryptographic operations to generate a decrypted feature control token and deriving the first feature state of the first feature from the decrypted feature control token. For example, in FIGS. 1, 3-4, and 5A-5B, the CDN edge feature selector 106 receives the feature control token and applies one or more cryptographic operations, e.g., decrypting with a shared key and/or validating with a private key, etc. before deriving the information including the feature state from the decrypted feature control token.

Figure 8:
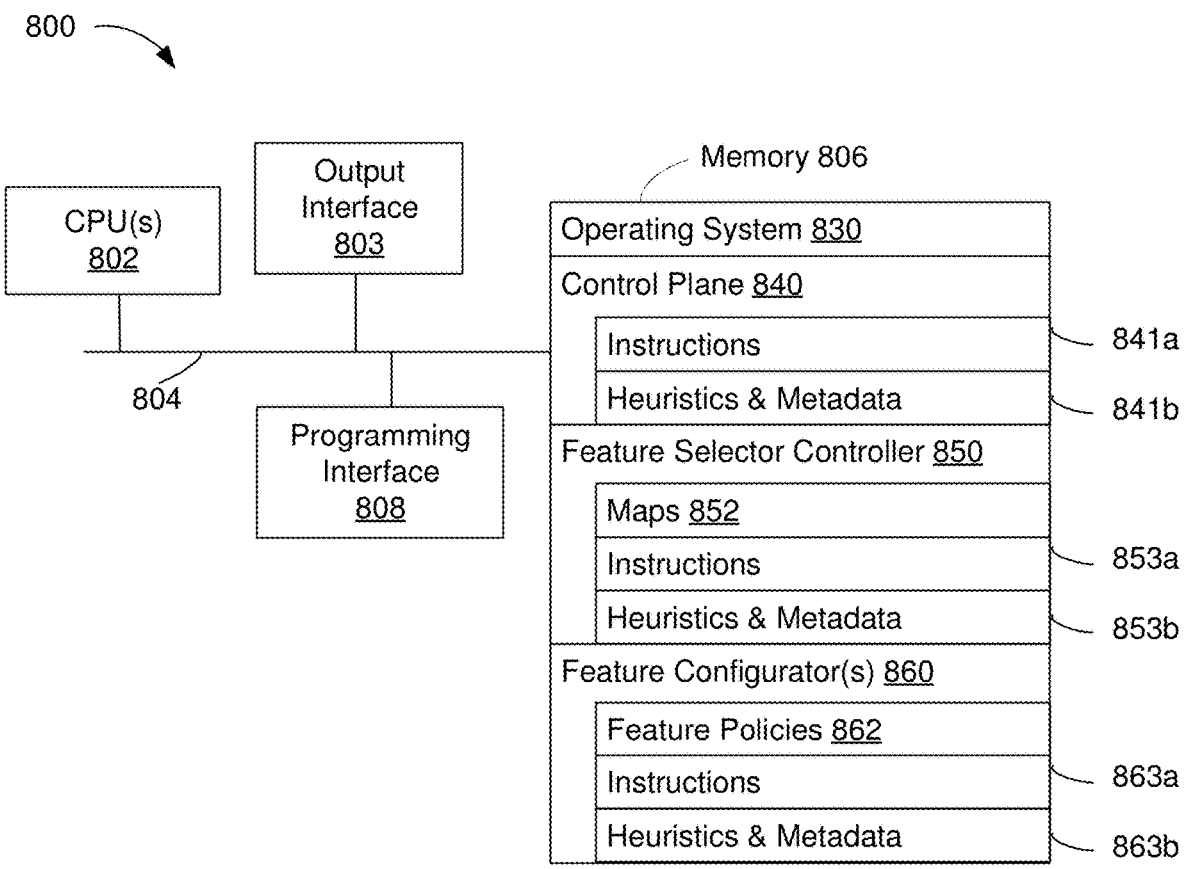
FIG. 8 is a block diagram of a computing device, in accordance with some embodiments.

FIG. 8 is a block diagram of a computing device 800 in accordance with some embodiments. In some embodiments, the computing device 800 corresponds to the control plane 103, the feature selector 105, and/or the feature configurators 110 hosted by one or more servers in the cloud in FIG. 1 and performs one or more of the functionalities described above with respect to the control plane 103, the feature selector 105, and/or the feature configurators 110 in the cloud. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors and/or controllers), one or more output interfaces 803 (e.g., a network interface), a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830, a control plane 840, a feature selector controller 850, and feature configurator(s) 860. In some embodiments, one or more instructions are included in a combination of logic and non-transitory memory. The operating system 830 includes procedures for handling various basic system services and for performing hardware dependent tasks.

In some embodiments, the control plane 840 (e.g., the control plane 103, FIG. 1) is configured to authenticate users and/or client devices, including handling the requests from the users and/or the client devices and providing URLs and/or authorization tokens for access to resources upon successful authentication. To that end, the control plane 840 includes a set of instructions 841a and heuristics and metadata 841b.

In some embodiments, the feature selector controller 850 (e.g., the feature selector controller 105, FIG. 1) is configured to generate a feature control token according to maps 852 (e.g., the maps 210, FIG. 2) and provide the feature control token to the control plane 840 upon request. To that end, the feature selector controller 850 includes a set of instructions 853a and heuristics and metadata 853b.

In some embodiments, the feature configurator(s) 860 (e.g., the feature configurators 110, FIG. 1) is configured to configure features according to feature policies 862. To that end, the feature configurator(s) 860 includes a set of instructions 863a and heuristics and metadata 863b.

Although the control plane 840, the feature selector controller 850, and the feature configurator(s) 860 are illustrated as residing on a single computing device 800 (e.g., integrated and/or coupled with each other on a single server), it should be understood that in other embodiments, any combination of the control plane 840, the feature selector controller 850, and the feature configurator(s) 860 can reside in separate computing devices in various embodiments. For example, in some embodiments each of the control plane 840, the feature selector controller 850, and the feature configurator(s) 860 reside on a separate computing device.

Moreover, FIG. 8 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 9:
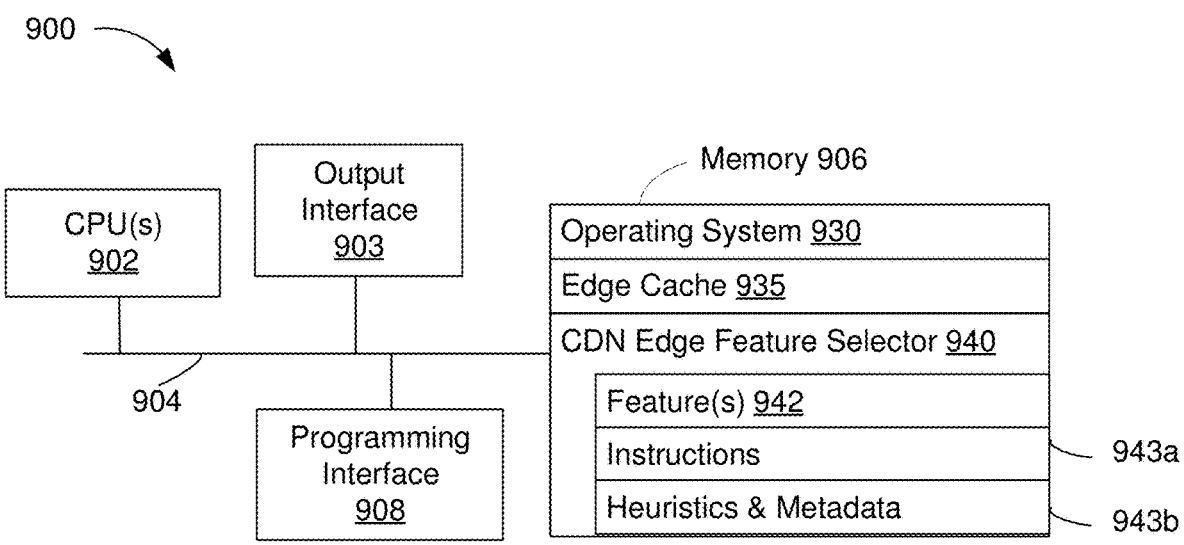
FIG. 9 is a block diagram of another computing device, in accordance with some embodiments.

FIG. 9 is a block diagram of a computing device 900 in accordance with some embodiments. In some embodiments, the computing device 900 corresponds to the CDN edge node 104 in the edge cloud in FIG. 1 and performs one or more of the functionalities described above with respect to the CDN edge node 104 in the edge cloud. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPU's) 902 (e.g., processors and/or controllers), one or more output interfaces 903 (e.g., a network interface), a memory 906, a programming interface 908, and one or more communication buses 904 for interconnecting these and various other components.

In some embodiments, the communication buses 904 include circuitry that interconnects and controls communications between system components. The memory 906 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some embodiments, the memory 906 or the non-transitory computer readable storage medium of the memory 906 stores the following programs, modules and data structures, or a subset thereof including an optional operating system 930, an edge cache 935, and a CDN edge feature selector 940. In some embodiments, one or more instructions are included in a combination of logic and non-transitory memory. The operating system 930 includes procedures for handling various basic system services and for performing hardware dependent tasks.

In some embodiments, the edge cache 935 (e.g., the edge cache 310, FIGS. 3 and 4) caches content and determines whether there is a cache miss or a cache hit when content is requested.

In some embodiments, the CDN edge feature selector 940 (e.g., the CDN edge feature selector 106, FIG. 1) is configured to select feature(s) 942 on the CDN edge node to activate or deactivate. To that end, the CDN edge feature selector 940 includes a set of instructions 943a and heuristics and metadata 943b.

Although the edge cache 935 and the CDN edge feature selector 940 are illustrated as residing on a single computing device 900 (e.g., a single CDN edge node), it should be understood that in other embodiments, any combination of the edge cache 935 and the CDN edge feature selector 940 can reside in separate computing devices in various embodiments. For example, in some embodiments each of the edge cache 935 and the CDN edge feature selector 940 reside on a separate computing device.

Moreover, FIG. 9 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
   at one or more servers with one or more processors and one or more non-transitory memory in a cloud:
   receiving from a client device a request for a media URL associated with a media asset;
   identifying one or more feature states associated with the client device and the media asset, wherein the one or more feature states indicate activating or deactivating of the one or more features on a content delivery network (CDN) edge node hosting the media asset;
   selectively generating a unique token or a common token specifying the one or more feature states based on mappings of tokens to the media asset and the client device; and
   sending the media URL referencing the CDN edge node to the client device, wherein the media URL includes the unique token or the common token, and wherein the unique token or the common token triggers changing the one or more feature states on the CDN edge node or bypassing changing the one or more feature states on the CDN edge node prior to obtaining the media asset for the client device.

2. The method of claim 1, wherein:
   the common token specifies a default state of one or more features deployed on the CDN edge node; and
   the unique token specifies an active state of the one or more features deployed on the CDN edge node.

3. The method of claim 1, wherein selectively generating the unique token or the common token specifying the one or more feature states includes:
   determining that one or more features with the one or more feature states on the CDN edge node are common to a set of client devices, including the client device requesting the media asset; and
   generating the common token specifying the one or more feature states for the client device requesting the media asset, wherein the common token is the same for each of the set of client devices requesting the media asset.

4. The method of claim 1, wherein selectively generating the unique token or the common token specifying the one or more feature states includes:
   determining that one or more features with the one or more feature states on the CDN edge node are unique to the client device requesting the media asset; and
   generating the unique token specifying the one or more feature states for the client device requesting the media asset, wherein the unique token is unique for each of a set of client devices requesting the media asset.

5. The method of claim 1, wherein the one or more servers includes a feature selector controller configured to perform the identifying step and the generating step, and the method further includes:
   requesting a feature control token from the feature selector controller in response to receiving the request;
   providing to the feature selector controller an asset identifier associated with the media asset and a client identifier associated with the client device; and
   obtaining the feature control token as the unique token or the common token from the feature selector controller, wherein the feature selector controller determines whether to provide the unique token or the common token based on the asset identifier and the client identifier.

6. The method of claim 5, wherein the feature selector controller is coupled with one or more feature configurators in the cloud configured to generate one or more features for deployment on the CDN edge node, and the method further includes:
   mapping one or more client identifier and media asset identifier tuples to the one or more features; and
   indicating whether the one or more client identifier and media asset identifier tuples receive the unique token or the common token.

7. The method of claim 6, further comprising:
   embedding an expiration time in the feature control token according to feature policies associated with the one or more features, wherein at the expiration time, the feature selector controller generates a second feature control token in response to a second request for the media URL and re-determines whether to provide the second feature control token as a second unique token or a second common token based on the feature policies.

8. The method of claim 1, further comprising:
   performing one or more cryptographic operations on the unique token or the common token, wherein the unique token or the common token is decryptable or verifiable by the CDN edge node.

9. A method comprising:
   at a content delivery network (CDN) edge node in an edge cloud with a plurality of features deployed on the CDN edge node:
   receiving a first media URL for a media asset, wherein the first media URL includes a first feature control token specifying one or more feature states of one or more features among the plurality of features, the one or more feature states indicate activating or deactivating of the one or more features, and the first feature control token is configured based on mappings of tokens to the media asset and a client device requesting the first media URL;
   determining whether the first feature control token in the first media URL causes a cache miss;
   changing or bypassing changing a first feature state of a first feature among the plurality of features according to the first feature control token based on whether the first feature control token in the first media URL causes the cache miss; and
   applying the first feature according to the first feature state prior to providing the media asset.

10. The method of claim 9, wherein changing or bypassing changing the first feature state of the first feature among the plurality of features according to the first feature control token includes:
    extracting parameters for applying the first features from the first feature control token; and
    activating the first feature according to the parameters.

11. The method of claim 9, wherein:
    the respective feature corresponds to watermarking; and
    changing or bypassing changing the state of the respective feature among the plurality of features according to the feature control token includes enabling or disabling embedding a unique watermark in the media asset according to the feature control token.

12. The method of claim 9, wherein:
    the respective feature corresponds to extensive logging; and
    changing or bypassing changing the state of the respective feature among the plurality of features according to the feature control token includes enabling or disabling extensive logging according to the feature control token.

13. The method of claim 9, wherein:
the respective feature corresponds to playing alternative content; and
changing or bypassing changing the state of the respective feature among the plurality of features according to the feature control token includes providing the alternative content or default content according to the feature control token.

14. The method of claim 9, wherein:
the respective feature corresponds to redirecting to a separate media content item; and
changing or bypassing changing the state of the respective feature among the plurality of features according to the feature control token includes redirecting to the separate media content item for a duration according to an expiration time of the feature control token.

15. The method of claim 9, wherein changing or bypassing changing the first feature state of the first feature among the plurality of features according to the first feature control token upon determining that based on whether the first media URL causes the cache miss includes:
forgoing changing the first feature state of the first feature among the plurality of features according to the first feature control token upon determining that the first media URL does not cause the cache miss.

16. The method of claim 9, wherein the first media URL for the media asset is received from a first client device, and the method further includes:
receiving a second media URL for the media asset from a second client device, wherein the second media URL includes a second feature control token different from the first feature control token;
determining whether the second media URL causes the cache miss; and
changing or bypassing changing a second feature state of a second feature among the plurality of features according to the second feature control token based on whether the second media URL causes the cache miss.

17. The method of claim 9, wherein the first media URL is received from a client device, the first feature control token specifies an expiration time of the first feature control token, and the method further includes:
determining whether the first feature control token has expired based on the expiration time in response to receiving the first media URL; and
declining the first feature control token upon determining that the first feature control token has expired, including forgoing the determining, the changing, and the applying steps, and triggering the client device to obtain a second feature control token.

18. The method of claim 9, further comprising caching the first media URL, including the first feature control token, as a cache key for determining the cache miss.

19. The method of claim 9, further comprising:
decrypting the first feature control token by applying one or more cryptographic operations to generate a decrypted feature control token; and
deriving the first feature state of the first feature from the decrypted feature control token.

20. A system comprising:
a server in a cloud configured to:
receive from a client device a request for a media URL associated with a media asset;
identify one or more feature states associated with the client device and the media asset on a content delivery network (CDN) edge node hosting the media asset in an edge cloud, wherein the one or more feature states indicate activating or deactivating of the one or more features;
selectively generate a unique token or a common token specifying the one or more feature states based on mappings of tokens to the media asset and the client device; and
send the media URL referencing the CDN edge node in the edge cloud to the client device, wherein the media URL includes the unique token or the common token as a feature control token, and wherein the unique token or the common token triggers updating the one or more feature states on the CDN edge node or bypassing updating the one or more feature states on the CDN edge node prior to obtaining the media asset for the client device; and
the CDN edge node in the edge cloud with a plurality of features deployed on the CDN edge node in the edge cloud is configured to:
receive the media URL for the media asset, wherein the media URL includes the feature control token specifying the one or more feature states;
determine whether the media URL causes a cache miss;
change or bypass changing a feature state of a feature among the plurality of features according to the feature control token based on whether the media URL causes the cache miss; and
apply the first feature according to the first feature state and prior to providing the media asset.

* * * * *